US008272045B2

(12) United States Patent
Azeez et al.

(10) Patent No.: US 8,272,045 B2
(45) Date of Patent: Sep. 18, 2012

(54) SYSTEM AND METHOD FOR SECURE REMOTE DESKTOP ACCESS

(75) Inventors: Rafman Azeez, Watchung, NJ (US); Hari Gopalkrishnan, Plainsboro, NJ (US)

(73) Assignee: Barclays Capital Inc., New York, NY (US)

( * ) Notice: Subject to any disclaimer, the term of this patent is extended or adjusted under 35 U.S.C. 154(b) by 664 days.

(21) Appl. No.: 11/638,673

(22) Filed: Dec. 14, 2006

(65) Prior Publication Data

US 2007/0143837 A1    Jun. 21, 2007

Related U.S. Application Data

(60) Provisional application No. 60/750,995, filed on Dec. 15, 2005.

(51) Int. Cl.
*G06F 9/00* (2006.01)
*H04L 9/32* (2006.01)

(52) U.S. Cl. .......................................... 726/15; 713/168

(58) Field of Classification Search .................... 726/15; 713/168
See application file for complete search history.

(56) References Cited

U.S. PATENT DOCUMENTS

| | | | | |
|---|---|---|---|---|
| 6,578,077 B1 * | 6/2003 | Rakoshitz et al. | ............ | 709/224 |
| 6,826,616 B2 | 11/2004 | Larson et al. | | |
| 7,032,022 B1 * | 4/2006 | Shanumgam et al. | ........ | 709/225 |
| 7,117,526 B1 * | 10/2006 | Short | ................................ | 726/5 |
| 7,139,276 B1 * | 11/2006 | Sitaraman et al. | ............. | 370/401 |
| 7,149,222 B2 * | 12/2006 | Wiryaman et al. | ............. | 370/401 |
| 7,324,447 B1 * | 1/2008 | Morford | ........................ | 370/231 |
| 7,376,743 B1 * | 5/2008 | Bazzinotti et al. | ............. | 709/229 |
| 7,664,048 B1 * | 2/2010 | Yung et al. | ....................... | 370/253 |
| 7,694,127 B2 * | 4/2010 | Adams et al. | .................. | 713/151 |
| 7,720,980 B1 * | 5/2010 | Hankins et al. | ................ | 709/229 |
| 7,814,208 B2 * | 10/2010 | Stephenson et al. | ........... | 709/227 |
| 7,860,978 B2 * | 12/2010 | Oba et al. | ....................... | 709/227 |
| 7,903,553 B2 * | 3/2011 | Liu | .............................. | 370/230.1 |
| 7,912,822 B2 * | 3/2011 | Bethlehem et al. | ............ | 707/705 |
| 2003/0079030 A1 * | 4/2003 | Cocotis et al. | ................. | 709/229 |
| 2004/0037268 A1 * | 2/2004 | Read | .............................. | 370/352 |
| 2004/0088409 A1 | 5/2004 | Braemer et al. | | |

(Continued)

FOREIGN PATENT DOCUMENTS

JP    3-89744    4/1991

(Continued)

OTHER PUBLICATIONS

"The simplest way to provide secure remote access to the desktop," [downloaded from: www.citrix.com/English/ps2/products/product. asp? content ID= 13994], downloaded on Dec. 11, 2006, 2 pages.

(Continued)

*Primary Examiner* — Techane Gergiso
(74) *Attorney, Agent, or Firm* — Morgan Lewis & Bockius LLP

(57) ABSTRACT

A secure remote access system includes client software installed on a portable computer that establishes a remote session with a counterpart server software installed on a server in a DMZ of the company's internal network through a secure tunnel. The DMZ server is connected to a router behind an enterprise second level firewall. The router routes the session to the appropriate desktop computer if the desktop is permitted remote access. A bandwidth limiter may be provided to balance the load through the router.

25 Claims, 1 Drawing Sheet

U.S. PATENT DOCUMENTS

| | | | |
|---|---|---|---|
| 2004/0145605 A1* | 7/2004 | Basu et al. | 345/740 |
| 2004/0185777 A1* | 9/2004 | Bryson | 455/41.1 |
| 2004/0215799 A1* | 10/2004 | Lehmann et al. | 709/230 |
| 2004/0250130 A1* | 12/2004 | Billharz et al. | 713/201 |
| 2005/0144186 A1* | 6/2005 | Hesselink et al. | 707/101 |
| 2005/0246447 A1 | 11/2005 | Smidt et al. | 709/229 |
| 2006/0059265 A1* | 3/2006 | Keronen | 709/228 |
| 2006/0064493 A1* | 3/2006 | Hammell et al. | 709/227 |
| 2006/0130124 A1* | 6/2006 | Richardson et al. | 726/3 |
| 2006/0142878 A1* | 6/2006 | Banik et al. | 700/17 |
| 2006/0167985 A1* | 7/2006 | Albanese et al. | 709/203 |
| 2006/0168321 A1* | 7/2006 | Eisenberg et al. | 709/238 |

FOREIGN PATENT DOCUMENTS

| | | |
|---|---|---|
| JP | 11-328118 | 11/1999 |
| JP | 2002-353979 | 12/2002 |
| JP | 2003-46537 | 2/2003 |
| JP | 2004-295166 | 10/2004 |

OTHER PUBLICATIONS

"I'm in Touch", [downloaded from: www.iminitouch.net], downloaded on Dec. 11, 2006, 2 pages.

"I'm in Touch—How it works", [downloaded from: www.iminitouch.net/what_is_how_it_works.asp], downloaded on Dec. 11, 2006, 2 pages.

Cisco IOS Quality of Service Solutions Configuration Guide, Release 12.2, 2001 [retrieved on Sep. 6, 2007]. Retrieved from the Internet <URL:http://www.control.auc.dk/~04gr832b/literature/cisco-qos-maual.pdf>.

[Citation 1] enNetforum/SSL VPN remote access session, Guide to SSL VPN building and setting demonstrated and explained by SSL VPN remote access session, Part 4: Integrating a Web system using SSL VPN, N+I Network, Japan, Softbank Publishing Corp., May 1, 2004, vol. 4, No. 5, pp. 142-147.

[Citation 2] Protect information from leakage from the office by centralized management using a client blade, Further advanced secure client solution, Hitac, Hitachi, Ltd., Jun. 1, 2005, pp. 9-12.

[Citation 3] Speed up a Web system in the era of EC, Part 5: Bandwidth limiting tool, Usage and function has been developed, and a flexible operation enhances its efficiency, Nikkei Internet Technology, Dec. 2000, Appendix, Speed up a Web system in the era of EC, Japan, Nikkei Business Publications, Inc., Nov. 22, 2000, vol. 41, pp. 40-43.

[Citation 4] Outline of remote authentication, System of Radius and point of building the same, Part 1: System of Radius, N+I Network, Japan, Softbank Publishing Corp., Mar. 1, 2003, vol. 3, No. 3, pp. 72-77.

[Reference 2] Being online is not scary, Countermeasures to network security in DTP, Professional DTP, Japan, Kogakusha, Ltd., Jul. 10, 2005, No. 200508, pp. 92-95.

[Citation 6] Maki Mitsuya, Understanding the [Settings] and [Security] for company networks at home LANs—LAN structures you don't hear about basic knowledge edition, company networks are just home LANs expanded around a central router, Ascii. PC, May 1, 2004, vol. 7, No. 5, pp. 158-163.

* cited by examiner

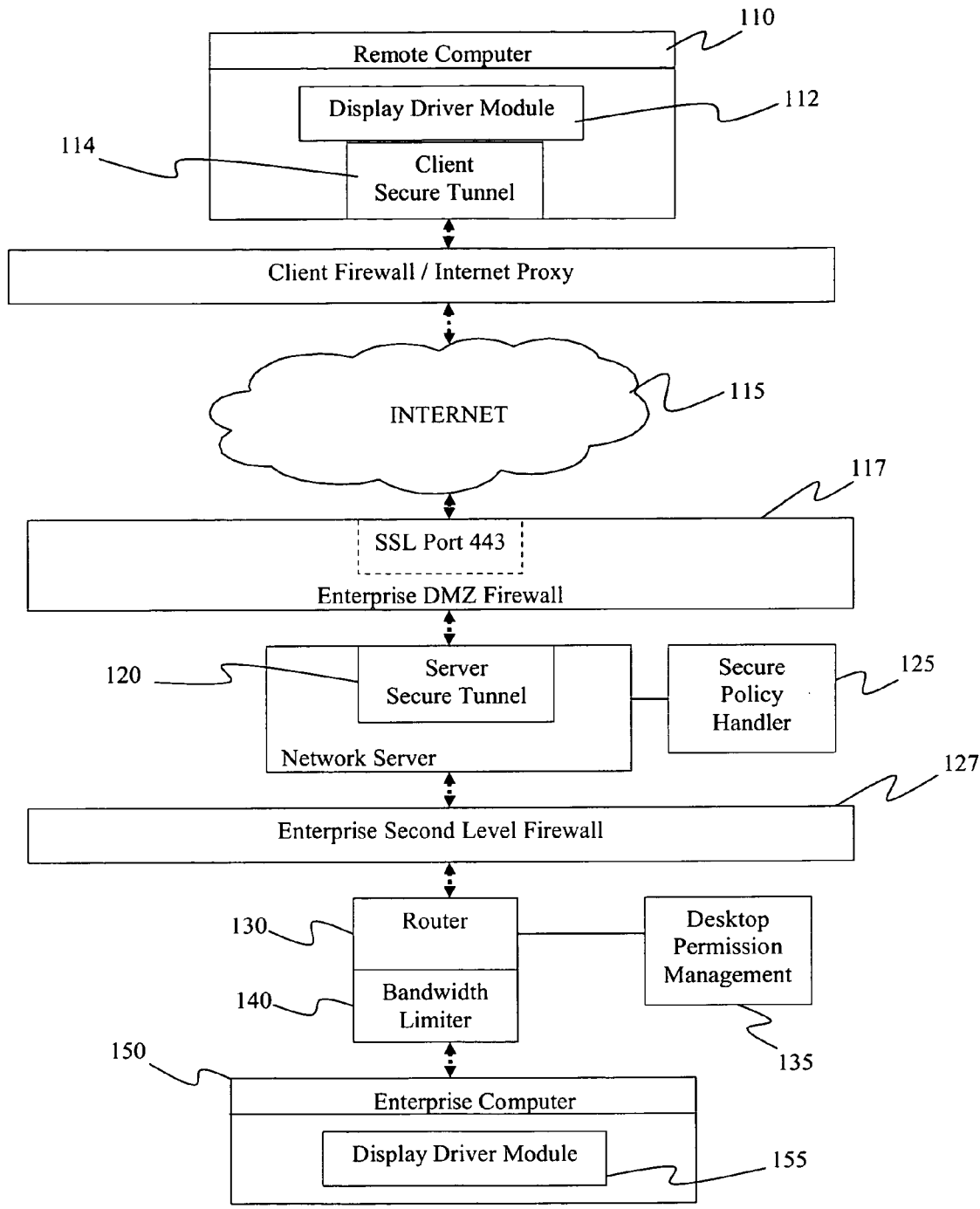

SYSTEM AND METHOD FOR SECURE REMOTE DESKTOP ACCESS

This application claims the benefit of U.S. provisional application No. 60/750,995 filed on Dec. 15, 2005, which is incorporated herein by reference.

BACKGROUND OF THE INVENTION

The present invention relates to secure computer networks. More specifically, the invention relates to systems and methods of securely accessing a remote desktop.

DESCRIPTION OF THE RELATED ART

A person frequently needs to access his/her desktop computer when away from his/her office. Employees may be able to access their desktop when out of the office via a communications network such as, for example, the internet. Directly accessing the desktop computer from the internet, however, presents a high security risk to the company's internal network and many companies prohibit direct access to the internal desktop from the internet.

Instead, companies provide remote access to the desktop computer via remote access software such as, for example, the Metaframe Access Suite available from Citrix Systems, Inc. of Ft. Lauderdale, Fla. In the Metaframe Access Suite, client software is installed on a portable computer that an employee takes with him/her when away from the office. The client software establishes a connection with a server running a server software component that establishes a secure communication channel between the portable computer and the server. The server creates a virtual machine of the employee's desktop computer that the user accesses instead of the desktop computer just as if he/she were accessing his/her desktop computer. The server creates a virtual machine for each employee accessing the server from a remote location. In other words, if there are twenty employees accessing the server from a remote location, the server creates twenty virtual machines. Although the employee only interacts with his/her virtual machine, the response will be degraded because the server's resources must be shared with the other virtual machines.

Another example of a remote access solution is the GoTo-MyPC service provided by Citrix Systems, Inc. of Ft. Lauderdale, Fla. The service installs a small server application on the desktop computer that periodically pings a broker that is hosted at a third-party site. A user at a remote computer goes to a secure web site and logs on when the user wants to communicate with the desktop computer. The broker matches the user to his/her desktop computer and assigns a session to a communication server that is also hosted at a third-party site. The communication server relays an opaque and highly compressed encrypted data stream from the remote computer to the office computer during the session. The service enables small companies with small IT/security staffs to transparently connect to their office computers from a remote location without having to maintain the security infrastructure provided by the service. In large companies, however, session initiation from the office computer increases network traffic and represents a significant increase in the monitoring of outgoing communications that many large companies routinely perform as part of their security policy. Therefore, there remains a need for systems and methods for directly and securely accessing the employee's desktop computer from a remote location.

SUMMARY OF THE INVENTION

The features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a secure remote access system includes client software installed on a portable computer that establishes a remote session with a counterpart server software installed on a server in a DMZ of the company's internal network through a secure tunnel. The DMZ server is connected to a router behind an enterprise second level firewall. The router routes the session to the appropriate desktop computer if the desktop is permitted remote access. A bandwidth limiter may be provided to balance the network usage and limits through the router.

An exemplary embodiment of the present invention is directed to a system comprising: a client secure tunnel stored on a remote computer; a server secure tunnel between an enterprise DMZ firewall and a second level firewall, the client secure tunnel and server secure tunnel forming a secure tunnel between the remote computer and the server secure tunnel; a router in communication with the server secure tunnel through the second level firewall; and an office computer in communication with the router, the office computer operated remotely by the remote computer through the secure tunnel and the router.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a block diagram illustrating an exemplary embodiment of the present invention.

DETAILED DESCRIPTION

Reference will now be made in detail to the preferred embodiments of the present invention, examples of which are illustrated in the accompanying drawings. The description herein should be understood to describe an exemplary embodiment of the invention. Those skilled in the art will recognize, for example, that the described embodiment is just one simplified example of the novel system and method of secure remote desktop access. Other embodiments in accordance with the description provided below may be used without departing from the scope of the present invention.

FIG. 1 is a block diagram illustrating an exemplary embodiment of the present invention. In FIG. 1, a remote computer 110 initiates a communication session with a secure tunnel server 120 over a communications network 115 such as, for example, the internet. The secure tunnel server 120 determines whether to allow the session by querying a secure policy handler 125. Once the session is allowed, the secure tunnel server 120 forwards the communication through the second level firewall 127 to a router 130 located inside the second firewall. The router 130 queries a desktop permission manager 135 to determine if the requested office computer is allowed remote access. If the requested office computer is allowed access, the router 130 routes the session traffic to the office computer 150. Once the session is established between the remote computer 110 and the office computer 150, the user can execute programs and access files on the office computer from the remote computer.

In the exemplary embodiment, remote computer 110 includes a client display module such as, for example, the Microsoft Remote Desktop Protocol (RDP) that is part of the Windows XP Professional operating system available from Microsoft Corporation of Redmond, Wash. RDP module 112 enables the remote computer to display the screen that the user would see when locally operating the office computer and to send input commands such as, for example, mouse movements and keyboard strokes from the remote computer to the office computer.

Remote computer 110 also includes a client secure tunnel 114, which encapsulates the RDP data for transmission over an unsecured network such as, for example, the internet. The client secure tunnel 114 also receives packets from the unsecured network, unwraps the RDP data, and forwards the RDP data to the RDP module 112.

The client secure tunnel 114 is preferably a Java program stored on the remote computer's storage device. While the use of a Java based client secure tunnel and RDP eliminates the need to install additional software components on the remote computer 110, other types of interfaces may be used without departing from the scope of the present invention. For example, other display protocols and platforms, such as ICA or X-Windows on a Linux platform may be used to operate the office computer 150 from the remote computer 110 and are understood to be within the scope of the present invention.

The client secure tunnel 114 communicates with a server secure tunnel 120 and may be located in the company's DMZ between an enterprise DMZ firewall 117 and an enterprise second level firewall 127. The server secure tunnel 120 receives packets from the client secure tunnel 114 via the unsecured network, unwraps the RDP data, and forwards the RDP data to the router 130. The server secure tunnel 120 also encapsulates outgoing RDP data received from the router 130 and transmits the encapsulated data to the client secure tunnel 114 over the unsecured network.

The tunnel established between the client secure tunnel 114 and the server secure tunnel 120 may be established through SSL port 443, for example, that most firewalls already accommodate. The use of the SSL port eliminates the need to custom configure the firewall in order to accommodate embodiments of the present invention, thereby reducing the risk of opening the company's network to an external attack.

In the exemplary embodiment, the server secure tunnel 120 may enforce the company's security policy through a secure policy handler 125. The secure policy handler 125 performs authentication and general web site permission management such as, for example, validating a username/password and/or username/access token numbers. Source IP address filtering and other restrictive mechanisms may be implemented by the security policy handler 125.

The system according to the exemplary embodiment of the present invention may employ variable security measures depending on the location of the remote computer 110. For example, if the remote computer 110 is part of the secure network but located in a different office or geographical location, only a login/password combination may be required to access the office computer 150. On the other hand, if the remote computer 110 is on a different network, such as a home computer requesting access through the Internet, additional security measures, such as a security token generated from a security token device, may be required for access. An example of a security token device is SecurID from RSA.

In addition, the security policy handler 125 may provide an interface between the server secure tunnel 120 and the company's security policy. An example of a security policy that can be interfaced with the server secure tunnel 120 is an asset database such as that described in U.S. application Ser. No. 11/025,871 filed Dec. 29, 2004, incorporated herein by reference. The server secure tunnel 120 may query the secure policy handler 125 when a connection request is received from the remote computer 110 to determine whether to establish the secure tunnel between the remote computer 110 and the server secure tunnel 120.

If the connection is allowed, the secure policy handler 125 may also enforce re-authentication/re-authorization if, for example, the remote computer 110 does not transmit data in a predetermined period (i.e., a timeout condition). To increase security while maintaining efficiency, a variable timeout condition may be employed depending on the type of client. For example, a session initiated from a trust client may be allowed an extended idle period (e.g., 4 hours) while a session initiated from an untrusted client (e.g., public business centers) may be limited to a shortened idle period (e.g., 15 minutes) before the session is terminated.

The server secure tunnel 120 communicates with the router 130 through the enterprise second level firewall 127. The second level firewall 127 is configured to allow communication between the server secure tunnel 120 and router 130 over a predetermined port.

The router 130 connects the remote session to the appropriate office computer 150 electronically. The router 130 enables the office computers access to the server secure tunnel 120 through a single connection through the enterprise second level firewall 127. Without the router 130, each office computer 150 would require a connection through the second level firewall 127, which represents a significant risk to the security architecture of the network.

Before establishing a connection to the office computer 150, the router 130 determines if the office computer 150 is allowed remote access by querying the desktop permission management 135. The desktop permission management 135 may be as simple as a list of office computers allowed remote access or may be an interface to the previously described asset database that may provide authentication and authorization. The desktop permission management 135 controls access to a specific office computer and may also restrict access to a specific office computer to a particular user.

Once the connection is permitted, the router 130 establishes a connection to the office computer 150. The office computer 150 includes a server display module 155 such as the RDP module that is part of the Windows XP Professional operating system as described above. The RDP module enables the remote user to run programs and open files on the office computer 150 just as if the remote user was in the office and operating the office computer 150.

After the connection is established with the office computer, a bandwidth limiter 140 monitors traffic between the office computer 150 and the remote computer 110. Generally, the bulk of the traffic between the office computer 150 and the remote computer 110 comprises updates to the display. Many remote display modules send updates of only the portions of the display that change when, for example, a cursor moves across the display. Sending only the portions of the display that change reduces the amount of data that must be sent to the remote computer 110 and reduces the strain on the company's network bandwidth.

When a new application is started or a new document is displayed on the office computer 150, the whole screen changes and the amount of transmitted data increases for a short period of time but decreases after a short period of time. The network can usually handle these transient spikes in data transmission rates since they occur for a short period of time and do not occur all at once. If, however, the remote computer 110 is viewing a video file from the office computer 150 where a large portion of the display is constantly changing, the remote connection may use a significant fraction of the available network bandwidth. Even if the network could support a single remote user viewing a video file, many networks would experience a slowdown if there were one hundred remote users viewing video files.

The bandwidth limiter 140 monitors the traffic between each remote computer 110 and its corresponding office computer 150. If the traffic increases above a predetermined threshold, the bandwidth limiter 150 begins a timer (not shown). If the traffic remains above the predetermined threshold for a predetermined time period, the bandwidth limiter 140 may begin to delay the transmission of the data packets. The delay causes the display on the remote computer to appear "jerky" in motion, thereby alerting the user that the user is using excessive bandwidth. The bandwidth limiter 140 may remove the limits (i.e., switch to normal operations) if it notices that the network performance of the session has returned to normal behavior.

As an added level of security, the exemplary embodiment of the present invention employs variable security access dependent on the location of the remote computer 110. For instance, if the remote computer 110 is on the same secure network but located in a different building or region, Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, it will be apparent to those skilled in the art that various modifications and variations can be made in the present invention without departing from the spirit or scope of the invention. Accordingly, the foregoing description is by way of example only and is not intended as limiting. Thus, it is intended that the present invention cover the modifications and variations of this invention provided they come within the scope of the appended claims and their equivalents.

What is claimed is:

1. A system, comprising:
a second client computer connected to a first network;
a server connected to the first network, the server including
a first communication module, wherein the first network further includes
a first firewall between the server and a first client computer, the first client computer including a second communication module, and
a second firewall between the server and the second client computer; and
a communication tunnel established between the first communication module and the second communication module to connect the second client computer to the first client computer through the server, wherein the first network includes a bandwidth limiter to monitor and regulate data flowing between the first client computer and the second client computer,
the first network includes a secure policy handler to determine if a connection request from the first client computer is to be granted,
the secure policy handler includes a variable timeout condition to terminate the communication tunnel,
the timeout condition includes a first idle period for a trusted client and a second idle period for an untrusted client, the first idle period being longer than the second idle period, and
the first client computer accesses a remote desktop on the second client computer.

2. The system of claim 1, wherein the first network includes a router to route a session from the first client computer to the second client computer.

3. The system of claim 1, wherein the bandwidth limiter includes a timer.

4. The system of claim 1, wherein the first client computer is connected to a second network.

5. The system of claim 4, wherein the second network is the Internet.

6. The system of claim 4, wherein the communication tunnel is established through the first and second networks.

7. The system of claim 1, wherein the first and second communication modules are Java applications.

8. The system of claim 1, wherein the secure policy handler includes different levels of authentication based on a location of the first client computer.

9. The system of claim 8, wherein a first level of authentication includes a login ID and password if the first client computer is located on the first network.

10. The system of claim 8, wherein a second level of authentication includes a login ID, password, and a security token if the first client computer is located on a second network.

11. The system of claim 1, wherein the secure policy handler includes an asset database.

12. The system of claim 1, wherein the first network includes a permission management module to manage access levels and permissions to the second client computer.

13. A method, comprising the steps of:
establishing a connection between a first client computer and a first network;
establishing a connection between the first client computer and a server on the first network; and
establishing a connection between the first client computer and a second client computer on the first network through the server,
wherein the step of establishing the connection between the first client computer and the first network includes obtaining access through a first firewall between the first client computer and the server,
wherein the step of establishing the connection between the first client computer and the second client computer includes obtaining access through a second firewall between the server and the second client computer, and wherein
the first network includes a bandwidth limiter to monitor and regulate data flowing between the first client computer and the second client computer,
the first network includes a secure policy handler to determine if a connection request from the first client computer is to be granted, the secure policy handler includes a variable timeout condition to terminate the connection between the first client computer and the second client computer, the timeout condition includes a first idle period for a trusted client and a second idle period for an untrusted client, the first idle period being longer than the second idle period, and the first client computer accesses a remote desktop on the second client computer.

14. The method of claim 13, further comprising the step of:

monitoring data flow between the first client computer and the second client computer;

comparing the data flow with a threshold; and limiting the data flow if the comparison is above the threshold.

15. The method of claim 13, wherein the connection between the first client computer and the first network is established through a second network.

16. The method of claim 15, wherein the second network is the Internet.

17. A method, comprising the steps of:

accessing a first client computer to connect to a first network; and logging onto a server on the first network to open a session, wherein the session is routed to a second client computer to establish a connection thereto, such that data and/or applications on the second client computer are directly accessed through the first client computer, wherein the step of accessing the first network includes obtaining access through a first firewall between the first client computer and the server, and routing the session to the second client computer includes obtaining access through a second firewall between the server and the second client computer, and wherein the first network includes a bandwidth limiter to monitor and regulate data flowing between the first client computer and the second client computer, the first network includes a secure policy handler to determine if a connection request from the first client computer is to be granted, the secure policy handler includes a variable timeout condition to terminate the connection between the first client computer and the second client computer, the timeout condition includes a first idle period for a trusted client and a second idle period for an untrusted client, the first idle period being longer than the second idle period, and the first client computer accesses a remote desktop on the second client computer.

18. The method of claim 17, wherein data flow between the first client computer and the second client computer is monitored and compared to a threshold, and the data flow is limited if the comparison is above the threshold.

19. The method of claim 17, wherein the first client computer is connected to the first network through a second network.

20. The method of claim 19, wherein the second network is the Internet.

21. A computer program product, comprising:

a client communication module to be executed on a first client computer;

a server communication module to be executed on a server connected to a first network; and a bandwidth limiting module that, when executed, monitors and regulates data flow between the first client computer and a second client computer, wherein the client communication module and the server communication module, when executed, establish a communication tunnel between the first client computer and the second client computer on the first network through the server so that the first client computer accesses a remote desktop on the second client computer, wherein the client communication module includes instructions that, when executed, cause access through a first firewall between the first client computer and the server, the server communication module includes instructions that, when executed, cause access through a second firewall between the server and the second client computer, the server communication module includes a secure policy module to determine if a connection request from the client communication module is to be granted, the secure policy module includes a variable timeout condition to terminate the communication tunnel, and the timeout condition includes a first idle period for a trusted client and a second idle period for an untrusted client, the first idle period being longer than the second idle period.

22. The computer program product of claim 21, wherein the client communication module includes instructions that, when executed, cause encapsulation of data to be transmitted to the server communication module.

23. The computer program product of claim 21, wherein the client communication module includes instructions that, when executed, cause unwrapping of packets received from the server communication module.

24. The computer program product of claim 21, wherein the client communication module and the server communication module are Java applications.

25. The computer program product of claim 21, wherein the bandwidth limiting module, when executed, compares the data flow between the first client computer and the second client computer with a threshold, and limits the data flow if the comparison is above the threshold.

* * * * *